United States Patent
Foletto

(10) Patent No.: US 11,333,530 B2
(45) Date of Patent: May 17, 2022

(54) ABSOLUTE ANGLE SENSOR WITH IMPROVED ACCURACY USING ERROR ESTIMATION

(71) Applicant: Allegro MicroSystems, LLC, Manchester, NH (US)

(72) Inventor: Andrea Foletto, Annecy le Vieux (FR)

(73) Assignee: Allegro MicroSystems, LLC, Manchester, NH (US)

( * ) Notice: Subject to any disclaimer, the term of this patent is extended or adjusted under 35 U.S.C. 154(b) by 350 days.

(21) Appl. No.: 16/689,494

(22) Filed: Nov. 20, 2019

(65) Prior Publication Data
US 2021/0148734 A1  May 20, 2021

(51) Int. Cl.
*G01D 5/244* (2006.01)
*G01D 5/245* (2006.01)
*G01D 5/14* (2006.01)

(52) U.S. Cl.
CPC ......... *G01D 5/24476* (2013.01); *G01D 5/145* (2013.01); *G01D 5/2452* (2013.01); *G01D 5/2454* (2013.01)

(58) Field of Classification Search
CPC ............. G01D 5/24476; G01D 5/2448; G01D 5/24485; G01D 5/2452; G01D 5/2454; G01D 5/24558; G01D 5/142; G01D 5/145; G01D 5/147; G01D 5/16; G01D 5/165; G01R 33/07; G01R 33/072; G01R 33/075; G01R 33/077; G01R 33/09; G01R 33/091; G01R 33/093; G01R 33/095; G01R 33/096; G01R 33/098; G01R 33/0023; G01R 33/0029; G01R 33/0035; G01R 33/0041; G01B 7/14; G01B 7/30

See application file for complete search history.

(56) References Cited

U.S. PATENT DOCUMENTS

| | | | |
|---|---|---|---|
| 9,389,060 B2 | 7/2016 | Romero et al. | |
| 9,400,164 B2 | 7/2016 | Daubert et al. | |
| 9,869,566 B2 | 1/2018 | Tima et al. | |
| 10,120,042 B2 | 11/2018 | Diaconu et al. | |
| 2003/0102860 A1* | 6/2003 | Haji-Sheikh | G01D 5/2451 324/174 |

(Continued)

OTHER PUBLICATIONS

U.S. Appl. No. 16/254,874, filed Jan. 23, 2019, Weiland, et al.
U.S. Appl. No. 16/254,869, filed Jan. 23, 2019, Weiland, et al.

*Primary Examiner* — David M Schindler
(74) *Attorney, Agent, or Firm* — Daly, Crowley, Mofford & Durkee, LLP

(57) ABSTRACT

In some embodiments, a method can include receiving, by an angle sensor, a first periodic angle signal indicative of an angle of a first magnetic field associated with a first track of a target; receiving, by the angle sensor, a second periodic angle signal indicative of an angle of a second magnetic field associated with a second track of the target; generating an uncorrected absolute angle signal indicative of an absolute angle of the target based on the first and second periodic angle signals; determining an estimated error associated with the uncorrected absolute angle signal based on the first periodic angle signal and the second periodic signal; subtracting the estimated error from the uncorrected absolute angle to generate a corrected absolute angle signal; and providing the corrected absolute angle signal as output of the angle sensor.

17 Claims, 9 Drawing Sheets

(56) References Cited

U.S. PATENT DOCUMENTS

| | | | | |
|---|---|---|---|---|
| 2004/0015307 A1* | 1/2004 | Heisenberg | .......... | G01D 5/2451 |
| | | | | 702/72 |
| 2005/0137768 A1* | 6/2005 | Lee | .................... | B62D 15/0245 |
| | | | | 701/41 |
| 2010/0225309 A1* | 9/2010 | Takahashi | ................ | G01P 3/443 |
| | | | | 324/207.25 |
| 2019/0390980 A1* | 12/2019 | Kakimi | .................... | G01D 5/16 |

* cited by examiner

ABSOLUTE ANGLE SENSOR WITH IMPROVED ACCURACY USING ERROR ESTIMATION

BACKGROUND

As is known, sensors are used in various types of devices to measure and monitor properties of systems in a wide variety of applications. For example, sensors have become common in products that rely on electronics in their operation, such as automotive and motor control systems.

Angle sensors can be used to provide angular position information and rotational speed of a target such as a rotational shaft or other rotational member. These sensors can be used in a wide array of applications such as industrial automation, robotics, power steering, motor position sensing and various vehicle applications such as seatbelt motor systems, transmission actuators, shift-by-wire systems, electronic braking systems and throttle systems.

Given a target having two tracks of features—or two targets, each with a single track of features—where the number of features (i.e., the number of magnetic poles) differs, it is possible to determine the absolute angular or linear position of the target using the Nonius principle. Along the lengths of the tracks, there is a continuing shift of pole alignment between the two tracks. Each target or track provides position information with the same periodicity as the number of poles. The absolute angular position of the target can be determined based on the difference in information provided by the two tracks, according to the Nonius principle.

The accuracy of angle sensors can be degraded by various factors. For example, an angle sensor may be subject to errors introduced during the manufacturing process, by non-linearities within the sensor's magnetic field sensing elements, or resulting from sensitivity to temperature variations. Moreover, in systems having multiple angle sensors, individual sensor errors can sum together and propagate through the system, adversely affecting overall system accuracy and performance.

SUMMARY

According to one aspect of the present disclosure, an absolute angle sensor can include: a first periodic angle sensor configured to generate a first periodic angle signal indicative of an angle of a first magnetic field associated with a first track of a target; a second periodic angle sensor configured to generate a second periodic angle signal indicative of an angle of a second magnetic field associated with a second track of the target; an absolute angle processor responsive to the first and second periodic angle signals and configured to generate an uncorrected absolute angle signal indicative of an absolute angle of the target; and an error correction processor. The error correction processor may be configured to: determine an estimated error associated with the uncorrected absolute angle signal using the first and second periodic angle signals, and subtract the estimated error from the uncorrected absolute angle to generate a corrected absolute angle signal.

In some embodiments, the first track can have a first number of features and the second track can have a second number of features different from the first number. In some embodiments, the first number of features may be one greater than the second number of features. In some embodiments, the absolute angle processor may be configured to generate the uncorrected absolute angle signal using the Nonius principle. In some embodiments, the error correction processor may be configured to determine the estimated error by calculating a difference of (a) a product of the first periodic angle signal and the second number of features and (b) a product of the second periodic angle signal and the first number of features. In some embodiments, the error correction processor can be configured to determine the estimated error using one or more error constants. In some embodiments, the sensor may further include a memory element configured to store the one or more error constants.

In some embodiments, the first periodic angle sensor may include a first magnetic field sensing element configured to generate a first magnetic field signal responsive to the first track and a second magnetic field sensing element configured to generate a second magnetic field signal responsive to the first track and orthogonal to the first magnetic field signal. In some embodiments, the second periodic angle sensor may include a third magnetic field sensing element configured to generate a third magnetic field signal responsive to the second track and a fourth magnetic field sensing element configured to generate a fourth magnetic field signal responsive to the second track and orthogonal to the third magnetic field signal.

In some embodiments, the target may be provided as a gear having a first number of gear teeth corresponding to the first track and a second different number of gear teeth corresponding to the second track. In some embodiments, the target can include a first structure supporting the first track and a second structure supporting the second track, wherein the first and second structures are separate structures.

According to another aspect of the present disclosure, a method can include: receiving, by an angle sensor, a first periodic angle signal indicative of an angle of a first magnetic field associated with a first track of a target; receiving, by the angle sensor, a second periodic angle signal indicative of an angle of a second magnetic field associated with a second track of the target; generating an uncorrected absolute angle signal indicative of an absolute angle of the target based on the first and second periodic angle signals; estimating an error associated with the uncorrected absolute angle signal using the first and second periodic angle signals; subtracting the estimated error from the uncorrected absolute angle to generate a corrected absolute angle signal; and providing the corrected absolute angle signal as output of the angle sensor.

In some embodiments, the first track can have a first number of features and the second track can have a second number of features different from the first number. In some embodiments, the first number of features may be one greater than the second number of features. In some embodiments, generating the uncorrected absolute angle signal can include using the Nonius principle.

In some embodiments, estimating the error associated with the uncorrected absolute angle signal can include calculating a difference of (a) a product of the first periodic angle signal and the second number of features and (b) a product of the second periodic angle signal and the first number of features. In some embodiments, estimating the error associated with the uncorrected absolute angle signal may include using one or more error constants. In some embodiments, the method can include retrieving the one or more error constants from a memory element of the angle sensor.

In some embodiments, the target may be provided a gear having a first number of gear teeth corresponding to the first track and a second different number of gear teeth corresponding to the second track. In some embodiments, the target can include a first structure supporting the first track and a second structure supporting the second track, wherein the first and second structures are separate structures.

According to another aspect of the present disclosure, an absolute angle sensor can include: means for receiving a first periodic angle signal indicative of an angle of a first magnetic field associated with a first track of a target; means for receiving a second periodic angle signal indicative of an angle of a second magnetic field associated with a second track of the target; means for generating an uncorrected absolute angle signal indicative of an absolute angle of the target based on the first and second periodic angle signals; means for estimating an error associated with the uncorrected absolute angle signal using the first and second periodic angle signals; means for subtracting the estimated error from the uncorrected absolute angle to generate a corrected absolute angle signal; and means for providing the corrected absolute angle signal as output of the angle sensor.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

As used herein, the term "module" generally refers to a collection of hardware and/or software configured to perform and execute the processes, steps, or other functionality described in conjunction therewith.

The drawings are not necessarily to scale, or inclusive of all elements of a system, emphasis instead generally being placed upon illustrating the concepts, structures, and techniques sought to be protected herein.

DETAILED DESCRIPTION

Described embodiments estimate and correct for errors associated with using the Nonius principle to determine the absolute angular or linear position of a target, resulting in improved accuracy. While embodiments of the present disclosure may be described in the context of sensors for providing angular position information, the techniques and structures sought to be protected herein may applied to sensors that provide other types of linear or angular information associated with a target, including but not limited to linear position, angular speed, and linear movement.

Figure 1:
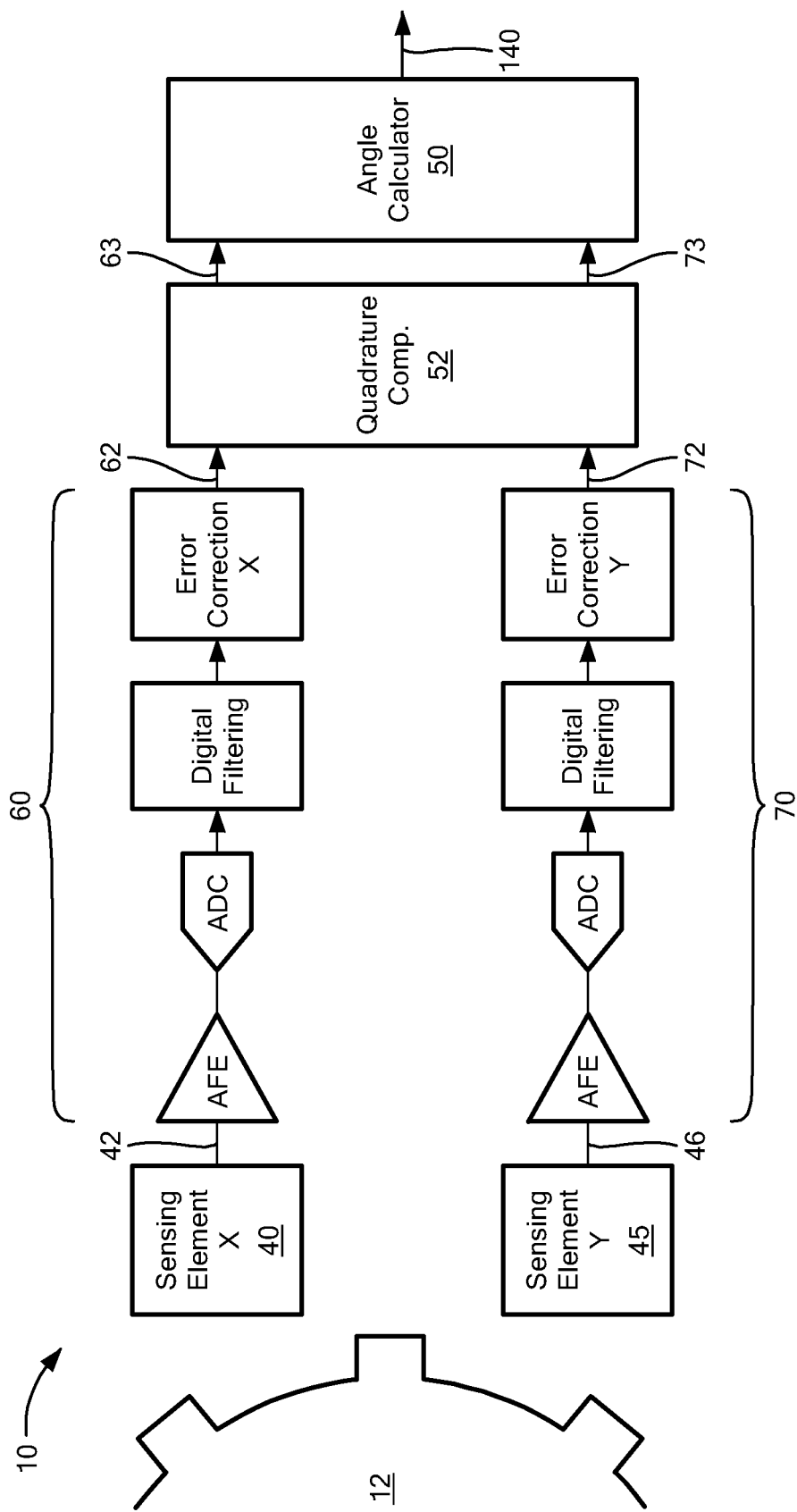
FIG. 1 is a block diagram showing a periodic angle sensor that may be used within some embodiments of the present disclosure.

Referring in FIG. 1, an angle sensor 10 may be used to provide angular position information for a target 12 by sensing a magnetic field associated with the target. As shown in FIG. 1, angle sensor 10 can include first and second magnetic field sensing elements 40, 45 coupled to respective sensing channels 60, 70, and an angle calculator 50. In some embodiments, angle sensor 10 may further include a quadrature compensation processor 52, as shown in FIG. 1. Each magnetic field sensing element (or "sensing element") 40, 45 may be configured to detect a magnetic field associated with the target 12. For example, sensing elements 40, 45 can detect advance and retreat of features of the target, such as domains of a ring magnet or teeth of a gear. The target features can be ferromagnetic and the magnetic field affected by movement of the target can be generated by a permanent magnet sometimes referred to as a back-bias magnet. Alternatively, the target features can be provided by a permanent magnet.

Sensor 10 can provide angular position information for various types of targets 12, including but not limited rotating targets such as a gear or magnet attached to a shaft. The structures and techniques sought to be disclosed herein can be used to provide angular position information for targets of various sizes and geometries. As discussed in detail below in the context of FIG. 3, embodiments of the present disclosure may be used to calculate the absolute angle of a rotating target having two tracks with differing numbers of features (e.g., gear teeth).

The angle sensor 10 can be used to sense the angular position of a target 12 using magnetic field sensing elements 40, 45 to detect a magnetic field and output magnetic field signals representative of the sensed magnetic field. Magnetic field sensing elements 40, 45 can be a magneto-transistor or magnetoresistance element, or a semiconductor magnetoresistance element such as an anisotropic magnetoresistance (AMR) sensing element, a giant magnetoresistance (GMR) sensing element, tunnel-magnetoresistance (TMR) sensing element, a magnetic tunnel junction (MTJ) sensing element, Indium Antimonide (InSb) or a Hall Effect element. In some embodiments, the magnetic field sensing element can be arranged to form a circular vertical hall (CVH) sensing element which can include a circular body with a plurality of Hall Effect elements disposed thereon and around the circumference of the circular body.

Further referring to FIG. 1, angle sensor 10 can have a first (or "X") sensing channel 60 that receives and processes raw sensor output from first magnetic field sensing element 40, and a second (or "Y") sensing channel 70 that receives and processes raw sensor output from second magnetic field sensing element 45. This raw sensor output can be magnetic field signals generated by the magnetic field sensing elements 40, 45. As target 12 rotates, its teeth or other features advance and retreat relative to the sensing elements 40, 45 and, in response, the sensing elements 40, 45 generate sinusoidal-like signals 42, 46. The magnetic field sensing elements 40, 45 can be configured such that the respective signals 42, 46 have a predefined phase separation (e.g., 90°). For example, first sensing element 40 may generate a cosine signal 42 and second sensing element 45 may generate a sine signal 46. The phase separation of signals 42, 46 can depend the arrangement of features on the target (e.g., tooth pitch) and the orientation of the sensing elements 40, 45.

Each sensing channel 60, 70 can include a series of circuits or components that process the magnetic field signals from the respective sensing elements 40, 45. For example, as shown in FIG. 1, each sensing channel 60, 70 can include an analog front end (AFE) having a filter, an amplifier, and/or other circuit element configured to attenuate or amplify amplitudes or filter frequencies. The AFE may receive the magnetic field signals and output modified magnetic field signals to an analog-to-digital converter (ADC) to digitize the magnetic field signals. Digital filtering circuitry and error correction circuitry included within the sensing channels 60, 70 can receive the digitized magnetic field signals and error correct the digitized signals. In some instances, the digital filtering circuit performs offset correction, sensitivity mismatch compensation, and non-orthogonality compensation. In some embodiments, the digital filtering circuit normalizes signals 42, 46 to have zero offset and to have substantially identical amplitude. It should be appreciated that while FIG. 1 illustrates two magnetic field sensing elements 40, 45, angle sensor 10 can include more than two magnetic field sensing elements.

In some embodiments, quadrature compensation processor 52 may be used to compensate for the case where signals 42, 46 are not orthogonal (i.e., not offset by 90 degrees). In particular, quadrature compensation processor 52 can receive digitized magnetic field signals 62, 72 from respective sensing channels 60, 70 and, in response, generate corresponding quadrature compensated signals 63, 73 that are offset by 90 degrees. The quadrature compensated signals 63, 73 may be received by angle calculator 50 as shown in FIG. 1. In other embodiments, quadrature compensation processor 52 may be omitted from the sensor 10 and angle processor 50 may directly receive digitized magnetic field signals 62, 72.

Angle calculator 50 receives digitized magnetic field signals 62, 72 from respective sensing channels 60, 70 (or quadrature compensated signals 63, 73 from processor 52) and uses the received signals to generate an output signal 140. Output signal 140 generated by the angle calculator 50 represents aspects of the sensed magnetic field such as the angular position of target 12. In some embodiments, signal 62 or 63 may be a cosine signal, signal 72 or 73 may be a sine signal, and angle calculator 50 can calculate an angle of target 12 as the arctangent of the cosine and sine signals. Angle calculator 50 can be a circuit comprising one or more logic gates, or a processor configured to compute trigonometric, exponential and logarithmic functions. In certain embodiments, angle calculator 50 can be provided as a coordinate rotation digital computer (CORDIC) processor configured to compute an arctangent function.

In the case where target 12 is a rotating target having a plurality of features (e.g., teeth), output signal 140 may have a periodicity equal to the number (N) of features. In other words, for each 360° rotation of target 12, output signal 140 may indicate N periodic changes or oscillations in angular position corresponding to the advance/retreat of the N features. Accordingly, angle sensor 10 may be referred to herein as a periodic angle sensor 10 and its output signal 140 may be referred to as a periodic angle signal 140. As used herein, the term "periodic angle signal" refers to a sinusoidal or other oscillating signal generated in response to a rotating target where the period of the signal is less than the period of rotation.

The output signal from an angle sensor, such as angle sensor 10 of FIG. 1, may be subject to various errors and inconsistencies that degrade the sensor's accuracy. Manufacturing or fabrication inconsistencies, sometimes referred to as factory errors, can include device errors associated with manufacture of the angle sensor. These factory errors can include, for example: non-linearities present within the magnetic field sensing elements (e.g., magnetic field sensing elements 40, 45); sensitivity variations of the sensing elements as a result of temperature changes or aging of the device; and non-orthogonality between the sensing channels of the sensing elements (e.g., sensing channels 60, 70). Application errors or system errors can include errors that are created when the angle sensor is used in a particular application. These errors can be any non-linearity generated over the angle sensor output as a result of mounting the angle sensor on an application board. For example, in certain applications the angle sensor can be installed on an application board such that the angle sensor is placed outside of a rotation axis of a rotating target. In this example, the out-of-rotation-axis placement causes the angle sensor to generate a non-linear transfer function of the magnetic angle versus the device output despite being used as a linear sensor. In other instances, application errors can be created when the angle sensor is used in an atypical manner such as when the angle sensor is used as a linear sensor thereby causing a non-linear transfer function of the angle versus the output. Still other types of errors are created when the angle sensor does not conform to an application's performance requirements or errors introduced by using the angle sensor in a system that operates at a certain speed, temperature, pressure or other similar parameter.

Figure 2:
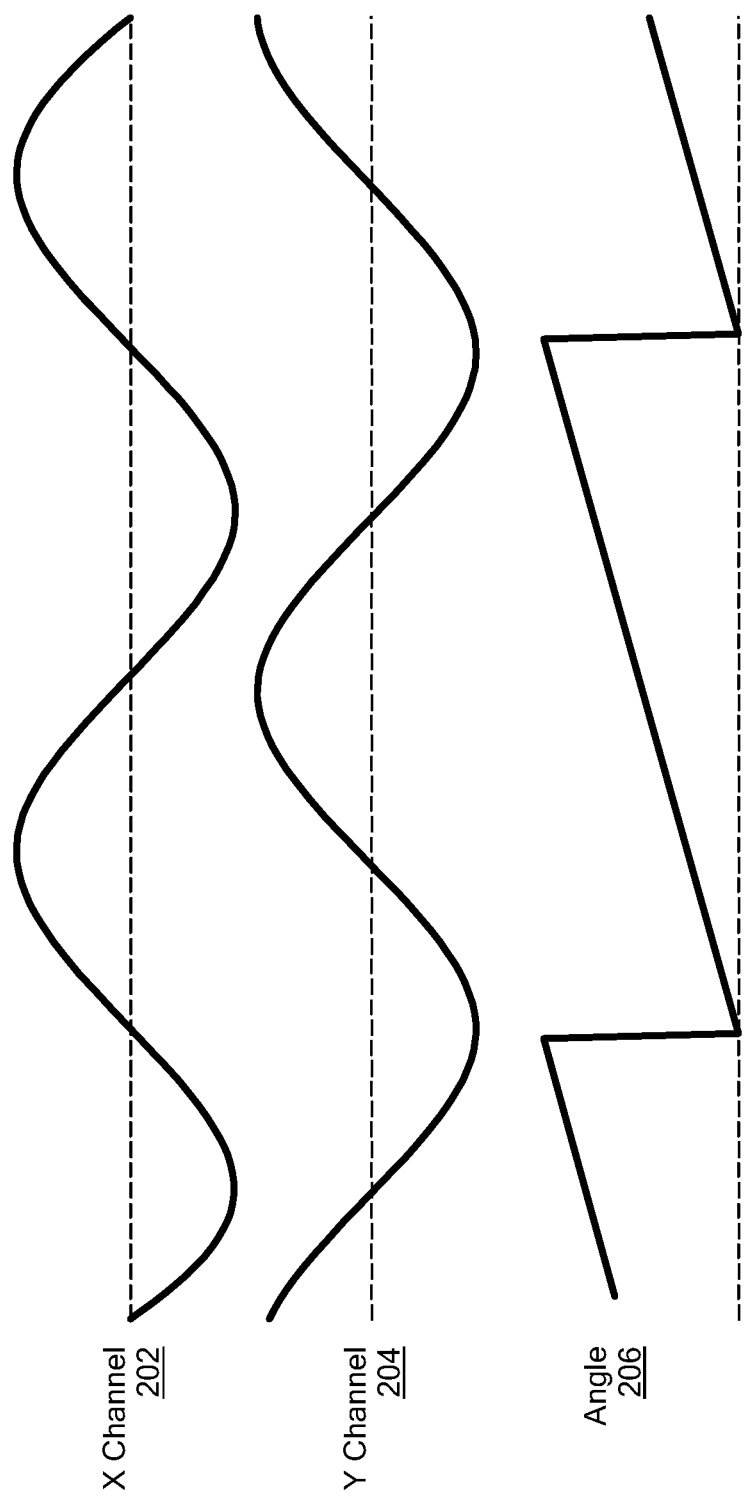
FIG. 2 is a graphical diagram illustrating a technique that can be used within the periodic angle sensor, according to some embodiments of the present disclosure.

FIG. 2 illustrates a periodic angle signal that can be generated by a periodic angle sensor, such as sensor 10 of FIG. 1. X and Y signals 202, 204 may correspond to signals generated by two magnetic field sensing elements (e.g., elements 40 and 45 of FIG. 1) in the presence of a moving target having a plurality of features such as gear teeth. The X and Y channel signals 202, 204 can be used to calculate a periodic angle signal 206 having periodicity equal to the number of features.

Figure 3:
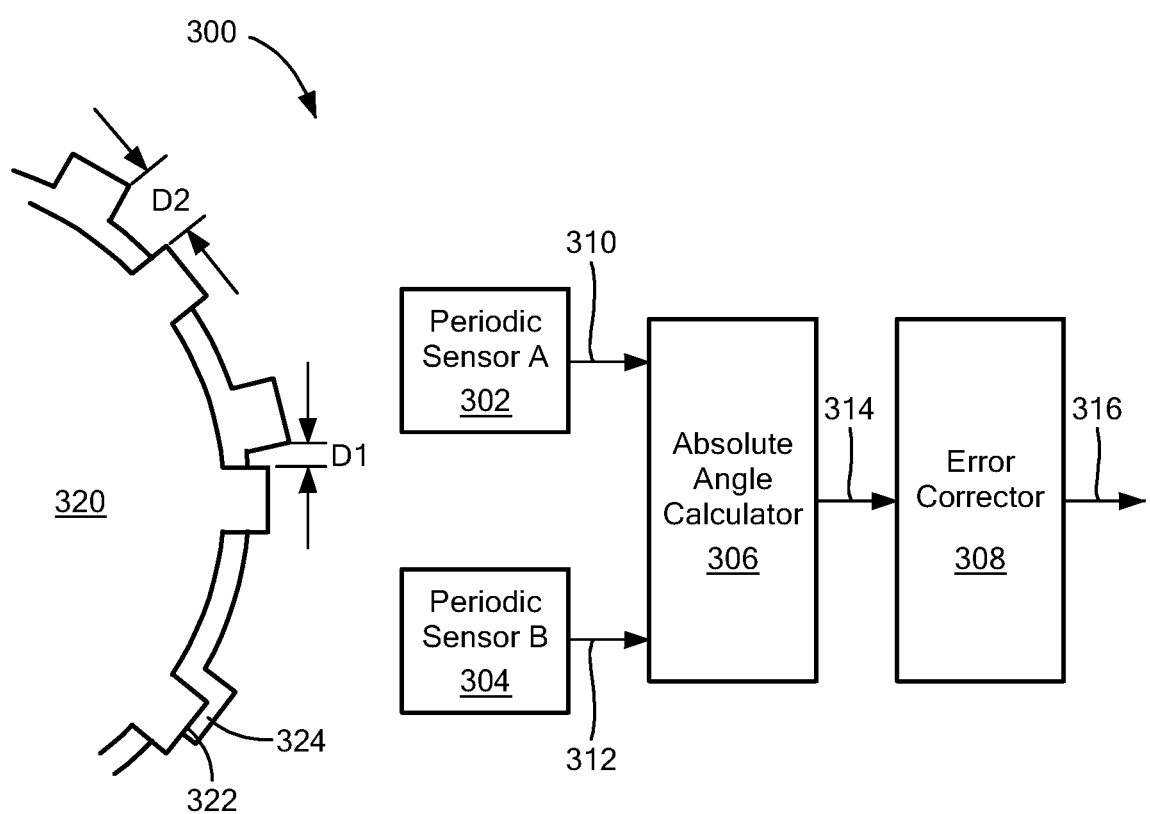
FIG. 3 is a block diagram showing an absolute angle sensor, according to an embodiment of the present disclosure.

Referring to FIG. 3, according to an embodiment of the present disclosure, an angle sensor 300 can be used to accurately determine the absolute angular position of a target 320 using the Nonius principle and a technique for estimating and correcting associated errors. The illustrative sensor 300 can include a first periodic angle sensor 302, a second periodic angle sensor 304, an absolute angle calculator circuit (or "absolute angle calculator") 306, and error correction circuit (or "error corrector") 308. In some embodiments, circuit 306 and/or circuit 308 may be implemented within a digital signal processor (DSP).

Each periodic angle sensor 302, 304 may be the same as or similar to sensor 10 described above in the context of FIG. 1. That is, each sensor 302, 304 can include a pair of magnetic field sensing elements configured to generate respective cosine and sine signals, along with circuitry to calculate a magnetic field angle based on these signals. Thus, in some embodiments, sensor 300 may include at least four (4) magnetic field sensing elements. Sensors 302, 304 can be provided as separate integrated circuits (IC) packages or as a single IC package. In some embodiments, the two pairs of magnetic field sensing elements along with circuits 306, 308 may be provided on a signal chip.

Target 320 may be a rotating structure having two tracks of features (e.g., teeth) 322 and 324, as shown in FIG. 1. In other embodiments, tracks 322, 324 may be located on separate rotating structures having substantially the same axis of rotation and angular velocity. A first track 322 may have a first number (N) of features and a second track 324 may have a second different number (M) of features. In some embodiments, first track 322 may have N teeth and second track 324 may have N−1 teeth (i.e., M=N−1). On a given track 322, 324, the features may be spaced approximately even along the length of the track. In some embodiments, the features may be gear teeth may have a rectangular shape, such as shown in FIG. 3, or a rounded shape. The features on track 322 can have substantially the same shape and size as those on track 324. The values of M and N can be selected to suit a particular application and, in particular, may be based at least in part on the diameter of the target and the spacing of the sensing elements.

First periodic angle sensor 302 may be configured to generate a first periodic angle signal 310 responsive to the first track 322, and second periodic angle sensor 304 may be configured generated a second periodic angle signal 312 responsive to the second track 324. In some embodiments, the two tracks 322, 324 (or two targets) may be physically separated at a distance selected to avoid crosstalk between the two magnetic field sensing channels (e.g., between sensors 302 and 304). As discussed above in the context of FIG. 1, each periodic angle signal 310, 312 may have a periodicity equal to the number of features on its respective sensed track 322, 324. Thus, signal 310 can have a periodicity of N and signal 312 can have a periodicity of M, where M=N−1 in some embodiments.

Absolute angle calculator 306 is configured to generate an absolute angle signal 314 based on the two periodic angle signals 310, 312. Signal 314 may also be referred to as an "uncorrected absolute angle signal." In the case where the numbers of features on tracks 322 and 324 differs, it is possible to determine the absolute angular position (or, in other examples, linear position) of target 320 using the Nonius principle. Along the lengths of the tracks 322, 324, assuming the features are evenly spaced, there is a continuing shift in alignment between the features of the two tracks, such as illustrated by spacings D1 and D2 in FIG. 3. Because the number of features is different, the periodicity of signals 310, 312 is also different. The difference between the periodic angle information ($\theta_a$) provided by first sensor 302 responsive to first track 322 and the periodic angle information ($\theta_b$) provided by second sensor 304 responsive to second track 324 can be used to calculate the target's absolute angle ($\theta_{abs}$) according to Nonius principle:

$$\theta_{abs} = (\theta_a - \theta_b) \bmod 360 \quad \text{(Eq. 1)}$$

where $\theta_{abs}$, $\theta_a$, and $\theta_b$ can represent angular position in degrees (°).

As discussed above in the context of FIG. 1, magnetic field sensors in general, and angle sensors in particular, may be subject to various types of errors that degrade sensor accuracy. For example, periodic angle signals 310, 312 may include manufacturing errors and/or application errors introduced in respective periodic sensors 302, 304. If the absolute angle ($\theta_{abs}$) is calculated from the two periodic angles ($\theta_a$, $\theta_b$), as in Eq. 1, the absolute angle signal 314 will, in the worst case, have an error that is equal to the sum of errors introduced by periodic sensors 302, 304.

To reduce (and ideally minimize) error within sensor 300, error corrector 308 can be configured to estimate and correct for errors in the absolute angle calculation of Eq. 1, above. In some embodiments, the error of the absolute angle generated using the Nonius principle can be estimated as:

$$E_{estimated} = \frac{2([(\theta_a M - \theta_b N) + C] \bmod 360)}{M+N} - D \quad \text{(Eq. 2)}$$

where N is the number of features on the track associated with periodic angle $\theta_a$, M is the number of features on the track associated with periodic angle $\theta_b$, and where C and D are first and second error constants. In some embodiments, M=N−1. As illustrated below in the context of FIG. 5B, the estimated error ($E_{estimated}$) from Eq. 2 may be "well matched" to the actual or intrinsic error resulting from using the Nonius principle to calculate absolute angle.

The first error constant, C, may be selected in an application-dependent manner, before, during, or after manufacture. For example, C may be chosen as the value that minimizes absolute angle error through application-dependent experimentation using the sensor 300. The second error constant, D, may likewise be selected empirically. In some embodiments, D may be calculated as:

$$D = \frac{C}{\frac{M+N}{2}} \quad \text{(Eq. 3)}$$

Although Eq. 3 shows one example where the second error constant (or "offset") D is calculated as a function of the first error constant C, in other embodiments D may be an chosen irrespective of C (i.e., the two error constants may be chosen independently and can each be arbitrary values).

In some embodiments, parameters N, M, C and/or D can be stored locally within a memory element (not shown) of the angle sensor 300. For example, one or more of these parameters can be stored onboard the angle sensor 300 within an electronically erasable programmable read-only memory (EEPROM) or any other memory element such that the value is accessible during error correction procedures. In certain embodiments, one or more of these parameters can be stored remotely in a separate memory element. When stored in a remote location, angle sensor 300 can access the stored parameters through a physical or wireless communication connection, such as a serial cable, a USB cable, an ethernet cable, a wireless network connection or any other similar type of connection.

Due to the fact that the estimated error (E estimated) matches well the intrinsic error in the absolute angle signal 314, it can be used to correct the error as follows:

$$\theta_{abs\_corrected} = \theta_{abs} - E_{estimated} \quad \text{(Eq. 4)}$$

Error correction circuit 308 can provide the corrected absolute angle ($\theta_{abs\_corrected}$) as the output signal 316 the sensor. Signal 316 may also be referred to as a "corrected absolute angle signal." Using the techniques disclosed herein, angle sensor 300 can provide absolute angular or linear position information of a target 320 with greater accuracy compared to existing sensors.

Figure 4A:
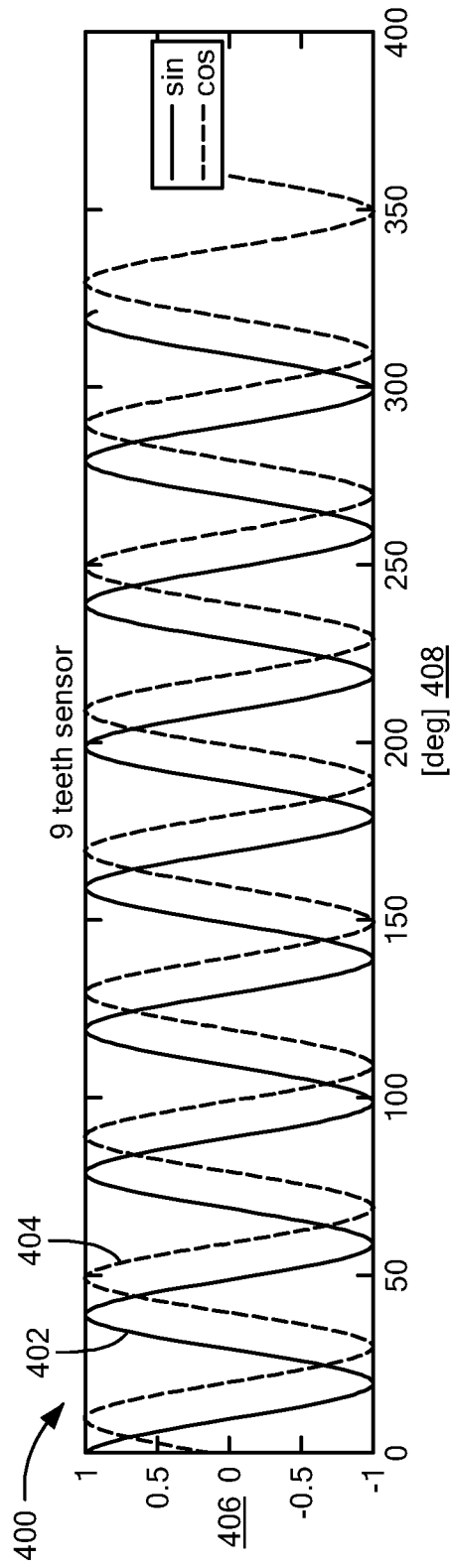
FIGS. 4A, 4B, and 4C are graphical diagrams illustrating a technique for determining absolute angle information within an absolute angle sensor, according to some embodiments of the present disclosure.
Figure 4B:
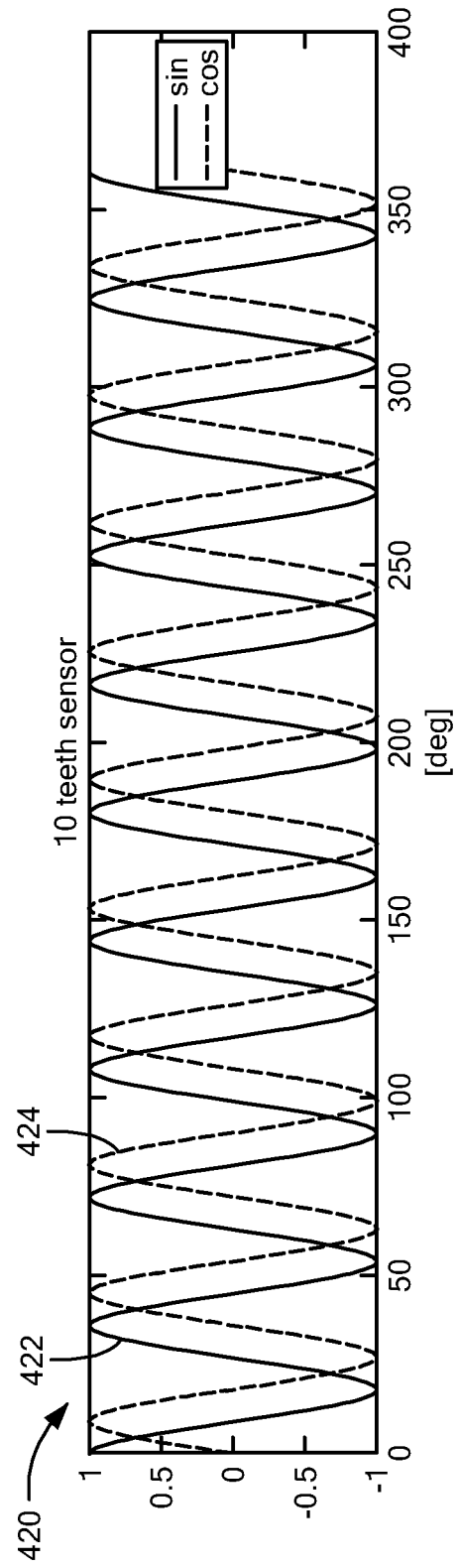
Figure 4C:
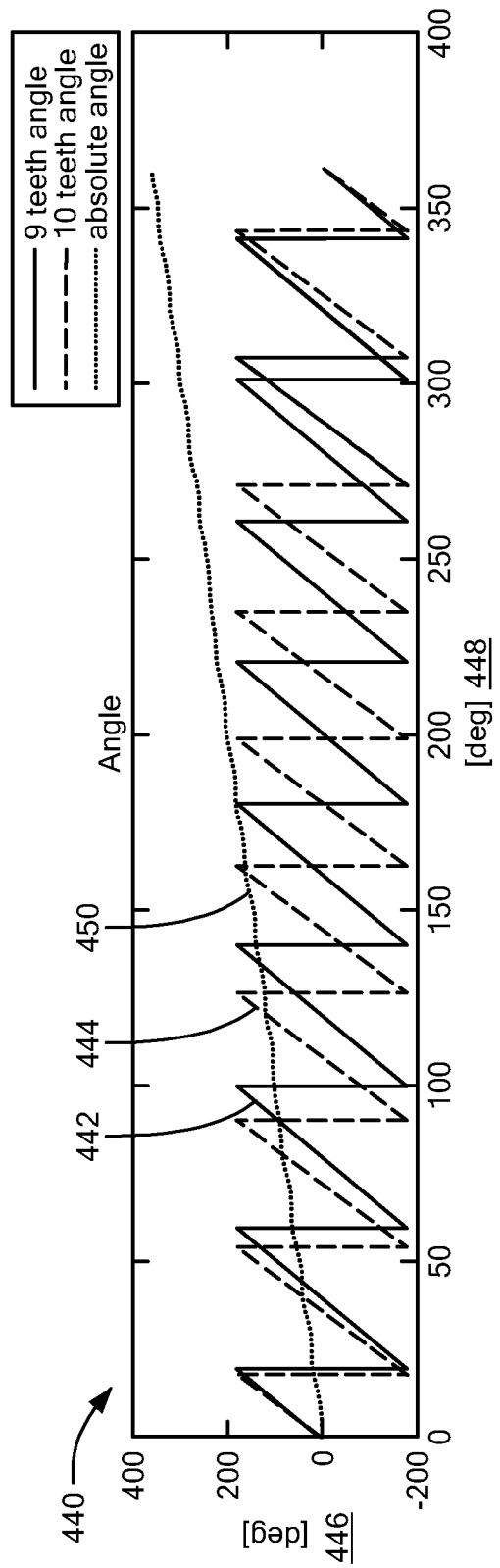

FIGS. 4A, 4B, and 4C illustrate how the Nonius principle can be used to determine the absolute angular position of a target having a first track with nine (9) features (e.g., gear teeth) and a second track with ten (10) features.

FIG. 4A illustrates the output of a pair of magnetic sensing elements (e.g., elements 40 and 45 of FIG. 1) configured to generate phase-separated sinusoidal signals responsive to a rotating target with nine (9) features. A first curve 402 may correspond to the output of a first sensing element or first sensing channel (e.g., X channel 60 in FIG. 1). A second curve 404 may correspond to the output of a second sensing element or second sensing channel (e.g., Y channel 70 in FIG. 1). Curves 402, 404 periodically oscillate between the values −1 and 1 (represented by vertical axis 406) over a 360° rotation of the first target track. It can be seen that the number of oscillations in FIG. 4A equals to the number of features (9) on the first target target track being sensed. FIG. 4B likewise shows a plot 420 of magnetic field sensing outputs 422, 424 with a periodicity of ten (10) over a 360° rotation of the second target track.

Turning to FIG. 4C, a plot 440 illustrates how an absolute position of a target can be calculated from two periodic angle signals. A first curve 442 may correspond to the output of a periodic angle sensor (e.g., sensor 10 of FIG. 1) in response to a rotating target track having nine (9) features, and a second curve 444 may correspond to the output of a periodic angle sensor responsive to a target track having ten (10) features. Thus, for example, curves 442 and 444 may be calculated based on the sensed magnetic field signals shown in FIGS. 4A and 4B, respectively. Curves 442, 444 periodically oscillate between −180° and 180° (represented by vertical axis 446) over a 360° rotation of the target (represented by horizontal axis 448) with first curve 442 having a periodicity of nine (9) and second curve 444 having a periodicity of ten (10). An absolute angle curve 450 may be calculated, for example, using Eq. 1 described above.

Figure 5A:
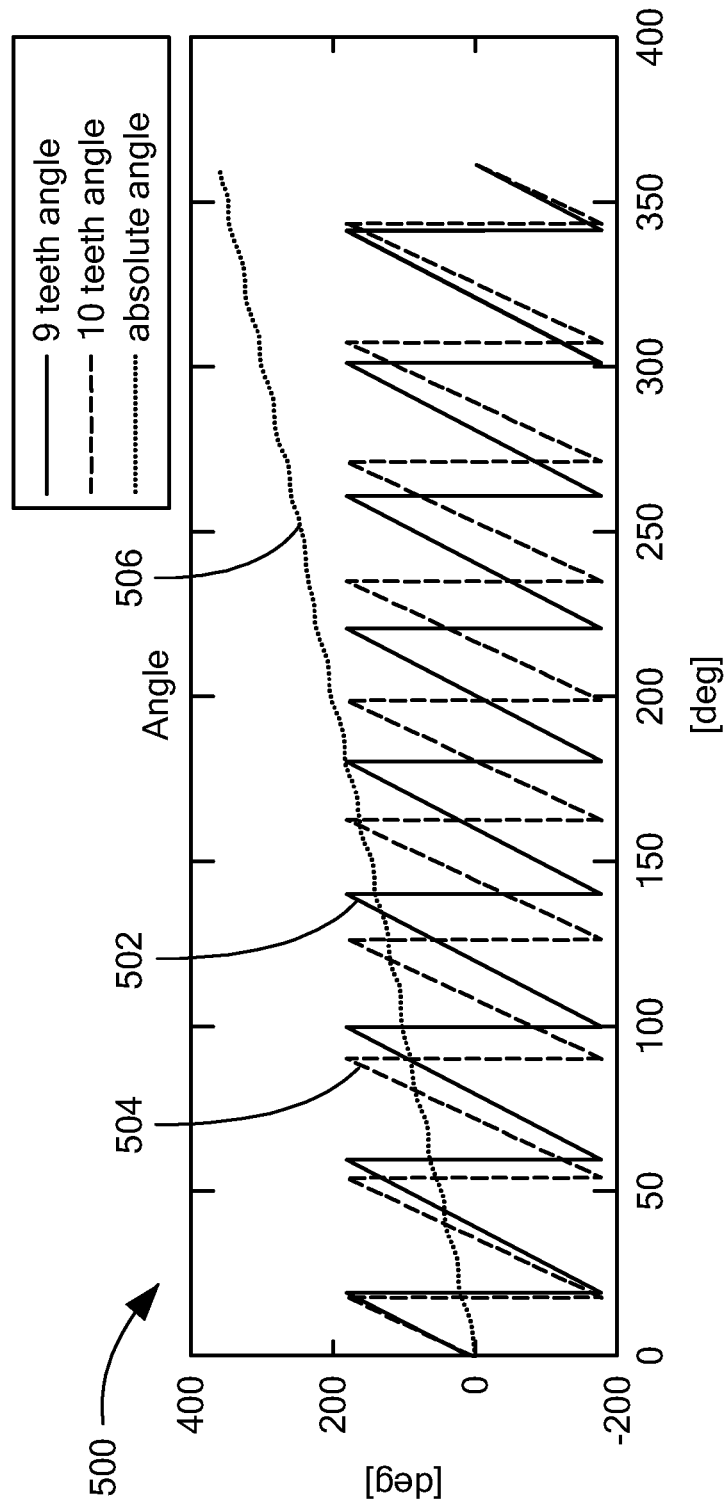
FIGS. 5A, 5B, and 5C are graphical diagrams illustrating an error correction technique that can be used within an absolute angle sensor, according to some embodiments of the present disclosure.
Figure 5B:
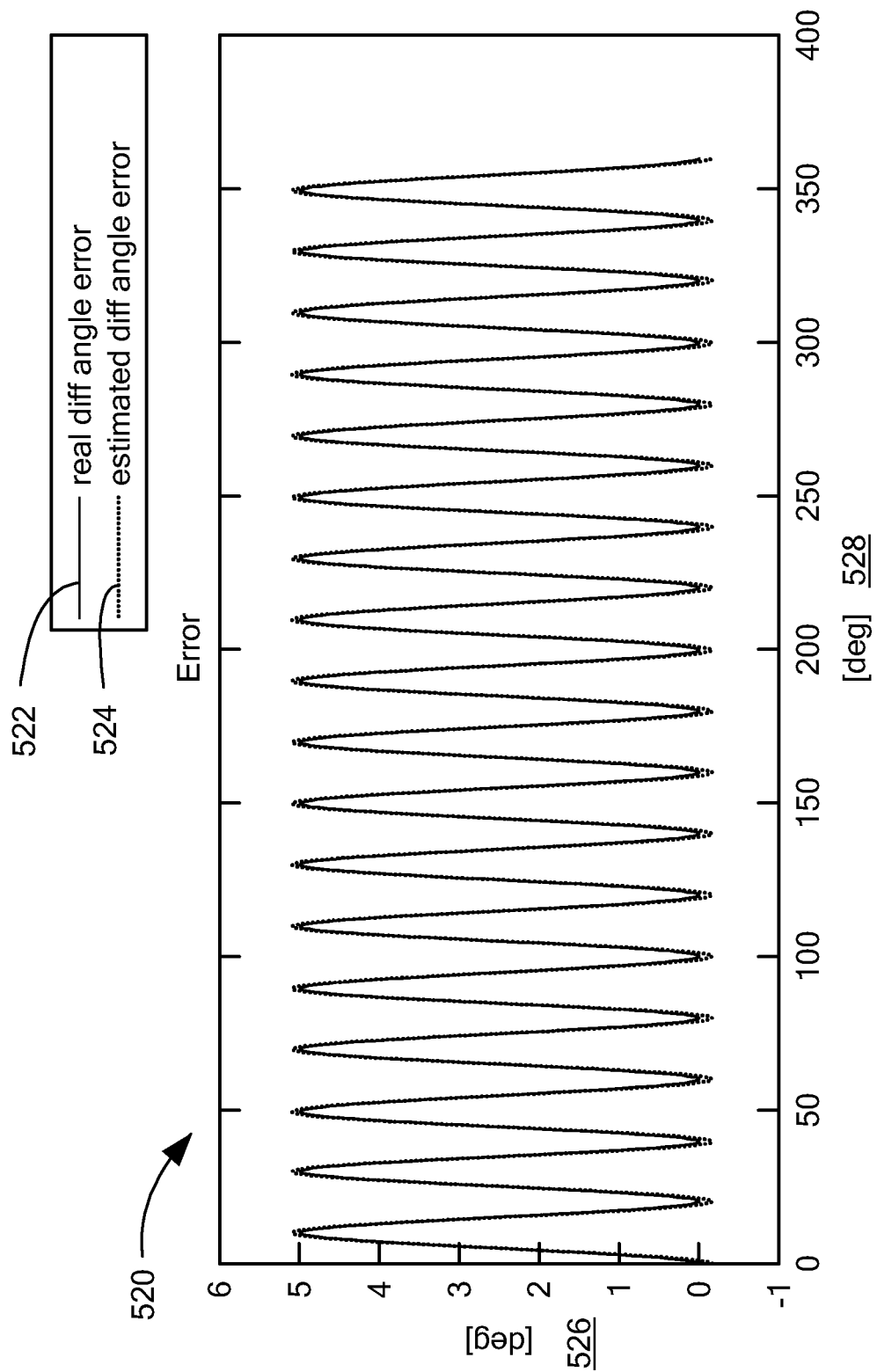
Figure 5C:
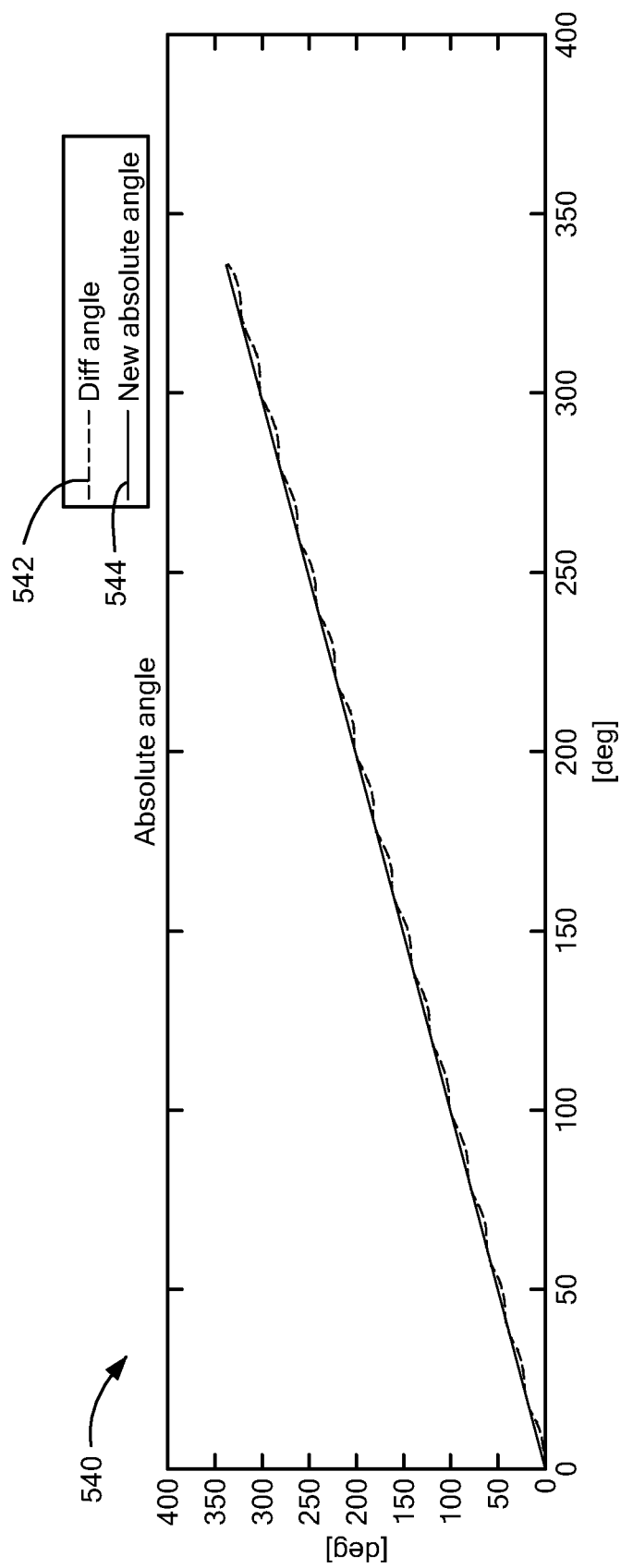

FIGS. 5A, 5B, 5C illustrate how errors introduced in a periodic angle sensor can degrade the accuracy of an absolute angle calculation based on the Nonius principle, along with technique for correcting such errors.

Referring to plot 500 of FIG. 5A, a first curve 502 may correspond to the output of a periodic angle sensor (e.g., sensor 10 of FIG. 1) in response to a target track having nine (9) features, a second curve 504 may correspond to the output of a periodic angle sensor in response to a target track having ten (10) features, and a third curve 506 may correspond to the absolute angle calculated based on curves 502 and 504 (e.g., using Eq. 1 above). As can be seen in FIG. 5A, the resulting absolute angle curve 506 may be non-linear due to errors introduced in one or both of the periodic angle sensors.

Referring to plot 520 of FIG. 5B, a first curve 522 may represent the real or intrinsic error in an absolute angle calculation (e.g., the error in curve 506 of FIG. 5A). As illustrated in FIG. 5B, the real error 522 may periodically oscillate between zero and a maximum value (represented by vertical axis 526) over a 360° rotation of the target (represented by horizontal axis 528). In the example shown, the absolute angle error 522 may have a periodicity of eighteen (18). A second curve 524 may represent the estimated angle error ($E_{estimated}$) determined, for example, using Eq. 2 above.

Referring to FIG. 5C, a plot 540 includes a first curve 542 representing the uncorrected absolute angle ($\theta_{abs}$) and a second curve 554 representing the corrected absolute angle ($\theta_{abs\_corrected}$), which can be generated, for example, using Eq. 4 above. It can be seen in the figure that corrected angle 554 has increased linearity compared with the uncorrected angle 542.

Figure 6:
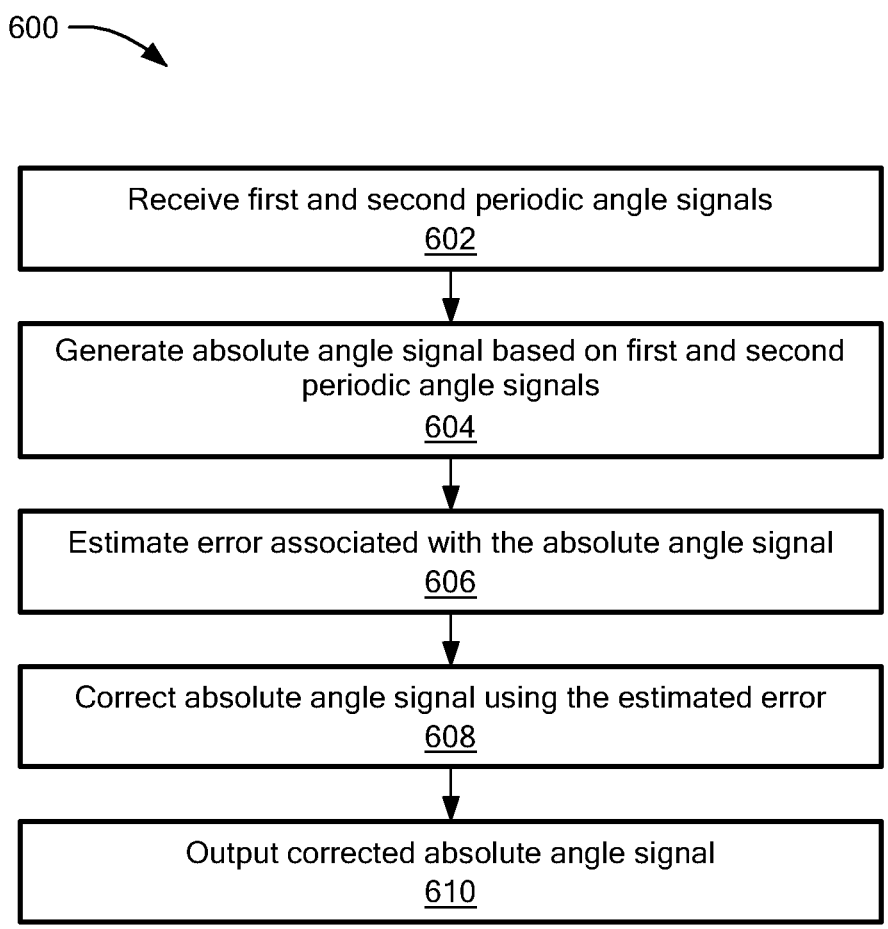
FIG. 6 is a flow diagram showing an illustrative process that may be implemented within an absolute angle sensor, according to some embodiments of the present disclosure.

FIG. 6 shows an illustrative process 600 for improving the accuracy of absolute angle sensors, according to embodiments of the present disclosure. Process 600 may be implemented within an angle sensor, such as within angle sensor 300 of FIG. 3. In some embodiments, process 600 may be implemented within one or more circuits or processors, such as circuits 306 and 308 in FIG. 3.

At block 602, first and second periodic angle signals may be received from respective first and second periodic angle sensors (e.g., angle sensors 302, 304 in FIG. 3). Each of the periodic angle signals may be generated using a pair of magnetic field sensing elements configured to generate phase-separated sinusoidal signals (e.g., sine and cosine signals) in response to a magnetic field. The first periodic angle signal may be responsive to a first track of a target having a first number (N) of features (e.g., gear teeth). The second periodic angle signal may be responsive to a second track of a target having a second number (M) of features. In some cases, M=N−1. The two tracks may be parts of the same target structure or may be parts of separate structures.

At block 604, an absolute angle signal may be generated based on the first and second periodic angle signals. The absolute angle may be calculated using the Nonius principle and, in certain embodiments, using Eq. 1 above. The absolute angle signal indicates the angular position of the target, e.g., between 0° and 360°. The signal may be non-linear due to errors introduced in the magnetic field sensing elements or respective circuitry used to calculate the first and second periodic angle signals.

At block 606, errors associated with calculating the absolute angle signal may be estimated. In certain embodiments, Eq. 2 may be used to estimate these errors. In some embodiments, one or more error constants (e.g., constant C and/or D in Eq. 2) may be retrieved from a memory element of the sensor and used as part the error estimation. The estimated error can be calculated as a continuous signal or as a discrete series of values.

At block 608, the estimated error signal/values may be subtracted from the absolute angle signal to generate a corrected absolute angle signal (e.g., using Eq. 4). At block 610, the corrected signal may be provided as the sensor output.

The disclosed magnetic field sensor embodiments can be used in a variety of applications, including, but not limited to an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field. The disclosed magnetic field sensors can be used, for example, to determine phase information within vehicle engines.

As used herein, the terms "circuit" and "processor" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the circuit or processor can be embodied in an application specific integrated circuit (ASIC), which can be an analog ASIC or a digital ASIC, in a microprocessor with associated program memory and/or in a discrete electronic circuit, which can be analog or digital. A circuit processor can contain internal processors or modules that perform portions of the function, operation, or sequence of operations. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

All references cited herein are hereby incorporated herein by reference in their entirety. Having described preferred embodiments, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

The invention claimed is:

1. An absolute angle sensor comprising:
   a first periodic angle sensor configured to generate a first periodic angle signal indicative of an angle of a first magnetic field associated with a first track of a target, the first track having a first number of features;
   a second periodic angle sensor configured to generate a second periodic angle signal indicative of an angle of a second magnetic field associated with a second track of the target, the second track having a second number of features different from the first number;
   an absolute angle processor responsive to the first and second periodic angle signals and configured to generate an uncorrected absolute angle signal indicative of an absolute angle of the target; and
   an error correction processor configured to:
      determine an estimated error signal associated with the uncorrected absolute angle signal by calculating a difference of (a) a product of the angle of the first periodic angle signal and the second number of features and (b) a product of the angle of the second periodic angle signal and the first number of features, and
      subtract the estimated error signal from the uncorrected absolute angle signal to generate a corrected absolute angle signal.

2. The sensor of claim 1, wherein the first number of features is one greater than the second number of features.

3. The sensor of claim 1, wherein the absolute angle processor is configured to generate the uncorrected absolute angle signal using the Nonius principle.

4. The sensor of claim 1, wherein the error correction processor is configured to determine the estimated error signal using one or more error constants.

5. The sensor of claim 4, further comprising a memory element configured to store the one or more error constants.

6. The sensor of claim 1, wherein the first periodic angle sensor comprises a first magnetic field sensing element configured to generate a first magnetic field signal responsive to the first track and a second magnetic field sensing element configured to generate a second magnetic field signal responsive to the first track and orthogonal to the first magnetic field signal, wherein the first periodic angle sensor is configured to generate the first periodic angle signal based on the first and second magnetic field signals.

7. The sensor of claim 6, wherein the second periodic angle sensor comprises a third magnetic field sensing element configured to generate a third magnetic field signal responsive to the second track and a fourth magnetic field sensing element configured to generate a fourth magnetic field signal responsive to the second track and orthogonal to the third magnetic field signal, wherein the second periodic angle sensor is configured to generate the second periodic angle signal based on the third and fourth magnetic field signals.

8. The sensor of claim 1, wherein the target is a gear having a first number of gear teeth corresponding to the first track and a second different number of gear teeth corresponding to the second track.

9. The sensor of claim 1, wherein the target comprises a first structure supporting the first track and a second structure supporting the second track, wherein the first and second structures are separate structures.

10. A method comprising:
    generating, by an angle sensor, a first periodic angle signal indicative of an angle of a first magnetic field associated with a first track of a target, the first track having a first number of features;
    generating, by the angle sensor, a second periodic angle signal indicative of an angle of a second magnetic field associated with a second track of the target, the second track having a second number of features different from the first number;
    generating an uncorrected absolute angle signal indicative of an absolute angle of the target based on the first and second periodic angle signals;
    estimating an error signal associated with the uncorrected absolute angle signal by calculating a difference of (a) a product of the angle of the first periodic angle signal and the second number of features and (b) a product of the angle of the second periodic angle signal and the first number of features;
    subtracting the estimated error signal from the uncorrected absolute angle signal to generate a corrected absolute angle signal; and
    providing the corrected absolute angle signal as output of the angle sensor.

11. The method of claim 10, wherein the first number of features is one greater than the second number of features.

12. The method of claim 10, wherein generating the uncorrected absolute angle signal comprises using the Nonius principle.

13. The method of claim 10, wherein estimating the error signal associated with the uncorrected absolute angle signal comprises using one or more error constants.

14. The method of claim 13, further comprising retrieving the one or more error constants from a memory element of the angle sensor.

15. The method of claim 10, wherein the target is a gear having a first number of gear teeth corresponding to the first track and a second different number of gear teeth corresponding to the second track.

16. The method of claim 10, wherein the target comprises a first structure supporting the first track and a second structure supporting the second track, wherein the first and second structures are separate structures.

17. An absolute angle sensor comprising:
    means for generating a first periodic angle signal indicative of an angle of a first magnetic field associated with a first track of a target;
    means for generating a second periodic angle signal indicative of an angle of a second magnetic field associated with a second track of the target;
    means for generating an uncorrected absolute angle signal indicative of an absolute angle of the target based on the first and second periodic angle signals;
    means for correcting an error associated with the uncorrected absolute angle signal by:
       estimating an error signal associated with the uncorrected absolute angle signal by calculating a difference of (a) a product of the angle of the first periodic angle signal and the second number of features and (b) a product of the angle of the second periodic angle signal and the first number of features, and subtracting the estimated error signal from the uncorrected absolute angle to generate a corrected absolute angle signal; and means for providing the corrected absolute angle signal as output of the angle sensor.

* * * * *

UNITED STATES PATENT AND TRADEMARK OFFICE
CERTIFICATE OF CORRECTION

PATENT NO. : 11,333,530 B2
APPLICATION NO. : 16/689494
DATED : May 17, 2022
INVENTOR(S) : Andrea Foletto It is certified that error appears in the above-identified patent and that said Letters Patent is hereby corrected as shown below:

In the Specification

Column 5, Line 30 delete "processor 50" and replace with --calculator 50--.

Column 9, Line 47 delete "554" and replace with --544--.

Column 9, Line 50 delete "554" and replace with --544--.

Signed and Sealed this
Twenty-fifth Day of April, 2023

Katherine Kelly Vidal
*Director of the United States Patent and Trademark Office*